United States Patent [19]
Anderson

[11] Patent Number: 5,934,510
[45] Date of Patent: Aug. 10, 1999

[54] FLUID DISPENSER APPARATUS

[76] Inventor: Mark L. Anderson, 303 S. MacKay Ave., Spring Valley, Wis. 54767

[21] Appl. No.: 08/870,918

[22] Filed: Jun. 6, 1997

Related U.S. Application Data

[60] Provisional application No. 60/019,249, Jun. 7, 1996.

[51] Int. Cl.⁶ ..................................................... B67B 7/24
[52] U.S. Cl. ........................... 222/83; 222/192; 222/324; 222/383.1; 604/183; 604/218; 604/237
[58] Field of Search ............................... 222/81–83.5, 88, 222/192, 324, 383.1; 604/183, 218, 237, 414

[56] References Cited

U.S. PATENT DOCUMENTS

| | | | |
|---|---|---|---|
| 1,496,126 | 6/1924 | Livingstone | 604/183 |
| 2,086,467 | 7/1937 | Bryan | 222/82 |
| 2,753,079 | 7/1956 | Hersey | 222/324 |
| 2,825,334 | 3/1958 | Kas, Sr. | 604/183 |
| 3,209,951 | 10/1965 | Greene et al. | 222/82 |
| 3,215,171 | 11/1965 | Mitchell | 222/192 |
| 3,228,564 | 1/1966 | Olson | 222/82 |
| 3,526,225 | 9/1970 | Isobe | 604/183 |
| 3,604,592 | 9/1971 | Bacon et al. | 222/192 |
| 3,827,601 | 8/1974 | Magrath et al. | 222/83 |
| 3,952,918 | 4/1976 | Poitras et al. | 222/82 |
| 3,952,919 | 4/1976 | Hansen et al. | 604/183 |
| 4,564,360 | 1/1986 | Young et al. | 604/183 |
| 4,678,107 | 7/1987 | Ennis, III . | |
| 4,826,050 | 5/1989 | Murphy et al. . | |
| 4,852,772 | 8/1989 | Ennis, III . | |
| 4,923,096 | 5/1990 | Ennis, III . | |
| 4,923,448 | 5/1990 | Ennis, III . | |
| 4,981,472 | 1/1991 | Ennis, III et al. . | |
| 4,995,867 | 2/1991 | Zollinger . | |
| 5,176,645 | 1/1993 | Guerrero . | |
| 5,190,191 | 3/1993 | Reyman | 222/256 |
| 5,217,442 | 6/1993 | Davis | 604/218 |
| 5,344,409 | 9/1994 | Ennis, III et al. . | |
| 5,413,255 | 5/1995 | Dent . | |
| 5,435,462 | 7/1995 | Fujii . | |
| 5,482,095 | 1/1996 | De Chollet | 222/192 |
| B1 4,981,472 | 2/1993 | Ennis, III et al. . | |
| B2 4,981,472 | 12/1996 | Ennis, III et al. . | |

*Primary Examiner*—J. Casimer Jacyna
*Attorney, Agent, or Firm*—Skinner and Associates

[57] ABSTRACT

A fluid dispenser used to administer fixed or adjustable doses of fluids in oral, intranasal, or injectable applications. The dispenser may be used to draw off fluid from a flexible or rigid bulk container or to draw fluid from a mounted flexible or rigid container such as a sealed-end bag or bottle, or a threaded bag or bottle. The dispenser may include an automatic venting feature to assist with the smooth, easy flow of fluid during an application and to prevent contaminants from being suctioned back into the container. The fluid dispenser generally comprises: a connection member communicatively connected to a fluid source container; a body member having a dose cylinder communicatively connected to the connection member; a piston member operationally related to the dose cylinder and spring biased in an extended position; and a trigger member attached to the piston member and communicatively connected to the dose cylinder through the piston member. Squeezing the trigger member of a primed dispenser will expel a predetermined dose of fluid from the dose cylinder out through the trigger member. Releasing the trigger member will draw the predetermined dose of fluid from the container into the dose cylinder.

24 Claims, 6 Drawing Sheets

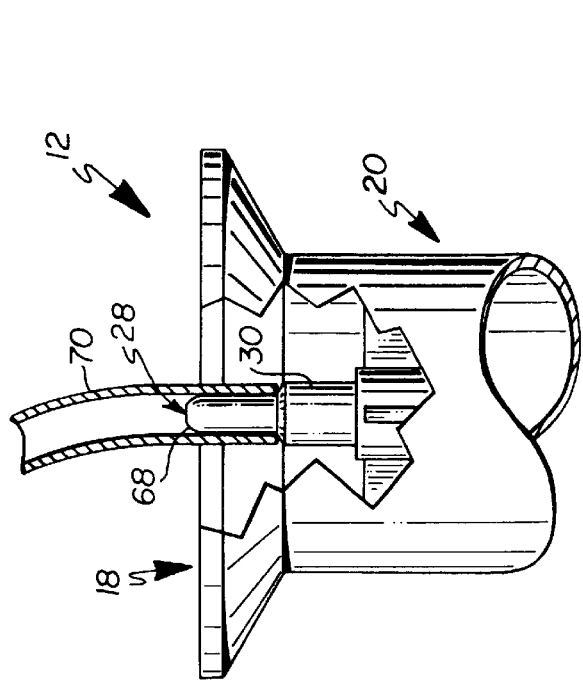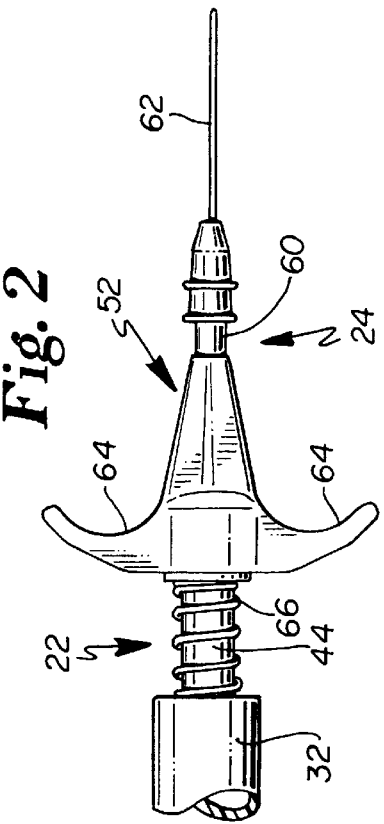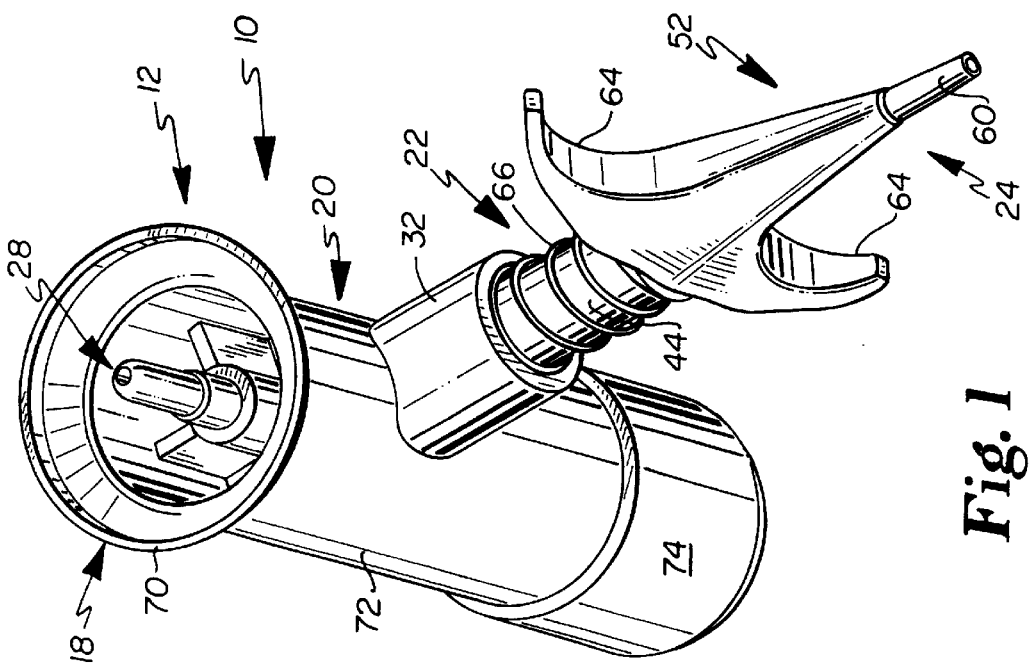

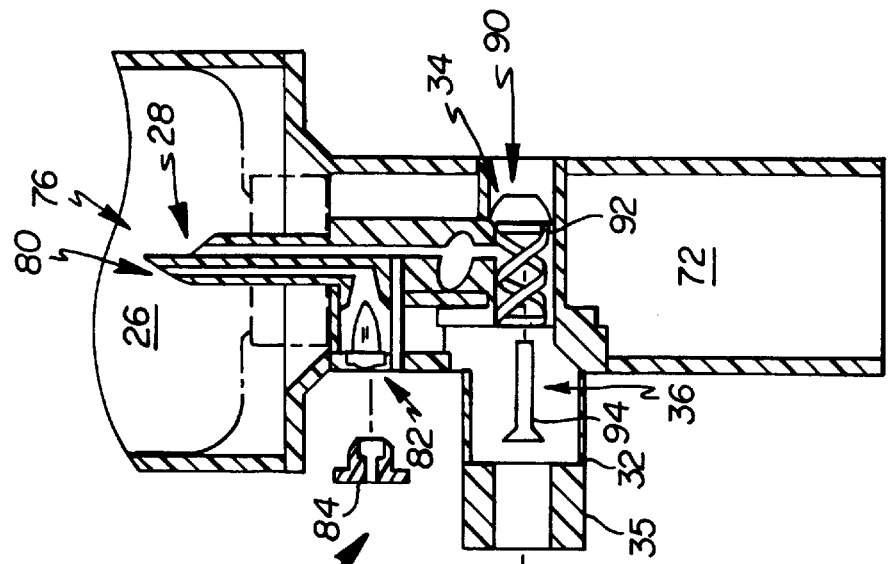
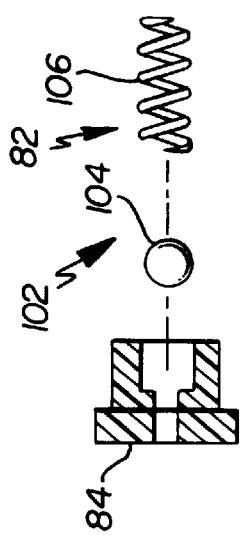
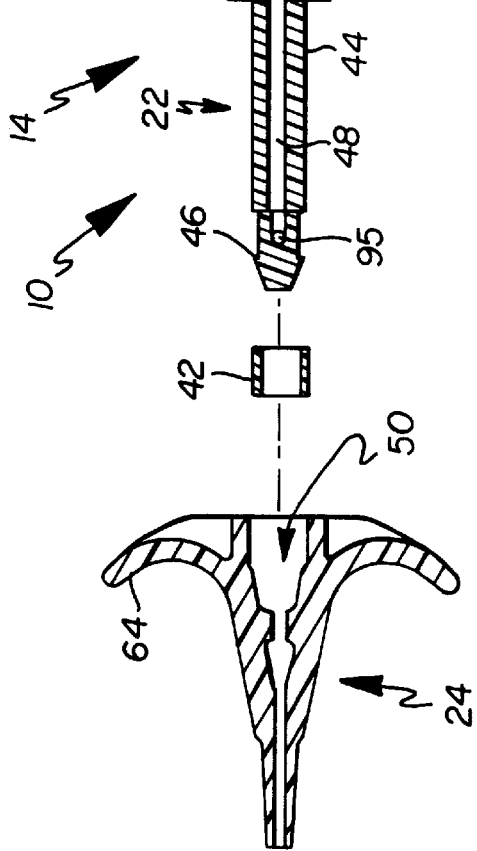
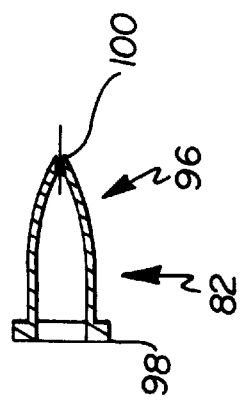

FLUID DISPENSER APPARATUS

CROSS-REFERENCE TO RELATED APPLICATIONS, IF ANY

This application claims the benefit under 35 U.S.C. §119 (e) of co-pending provisional application Ser. No. 60/019,249 filed Jun. 7,1996.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention.

The present invention relates, generally, to apparatus and methods for delivering fluids. More particularly, the invention relates to dispensers used to administer medicine. It has an optimal use in delivering multiple doses of various fluids to livestock in oral, intranasal, or injectable applications. However, the invention also may have utility in other applications.

2. Background Information.

The state of the art includes various devices and methods for dispensing fluids from containers, including pump bottles, spray cans and spray guns. Fluids such as drugs, nutritional supplements and the like have been dispensed to livestock using pop bottles or similar containers, syringes and gas powered gun-type devices for delivering liquid from bulk containers.

The gun-type devices provide methods for drawing and delivering liquid for oral, hypodermic and topical applications using compressed gas. Therefore they need to be attached to compressed air lines or carry their own pressurized propellant. Although these gun-type devices can deliver adjustable and repeatable doses automatically, they are they are relatively complex and expensive. Furthermore, their mobility is hampered because they require a pressurized gas source. These gun-type devices are generally shown in the following art: Guerrero (U.S. Pat. No. 5,176,645) which describes a pneumatic modular device for dispensing medicine to animals; Murphy et al. (U.S. Pat. No. 4,826,050) which describes a spraying and dosing apparatus used to dispense liquid herbicides and insecticides; and Dent (U.S. Pat. No. 5,413,255) which describes improvements in gas powered applicators for dispensing measured doses of a liquid.

The syringe type devices provide a generally simpler method of dispensing doses. However, they generally require the user to repeatably and manually draw and then dispense the desired doses. Syringe type devices are generally shown in the following art: Ennis, III (U.S. Pat. No. 4,923,096) which describes a dripless automatic syringe for dispensing fluids; Ennis, III (U.S. Pat. No. 5,344,409) which describes a syringe latch; Ennis, III (U.S. Pat. No. 4,852,772) which describes a dispenser for viscous fluids; Ennis, III (U.S. Pat. No. 4,678,107) which describes a dripless dispenser for liquids and viscous fluids; and Ennis, III (U.S. Pat. No. 4,981,472) which describes a cannula assembly for a syringe.

These known devices and methods are believed to have certain limitations in certain cases. Specifically, these problems include the inability to dispense accurate doses, to accurately place or inject the doses, to function automatically and quickly, to be efficiently and easily used and maintained, to function with various container types, and to be disposable. Because of these problems, the known devices and methods are unable to economically and rapidly process livestock.

Applicant's invention provides a dispenser which overcomes the limitations of the known art. It promotes the economic and rapid processing of livestock through its ergonomic design, automatic features, and its ability to accurately place fixed, accurate doses drawn from a variety of fluid containers. The dispenser can be easily lubricated, cleaned and disinfected. However, the dispenser is also relatively inexpensive, thus making it semi-disposable as warranted by the circumstances.

BRIEF SUMMARY OF THE INVENTION

The present invention provides a fluid dispenser which generally comprises: (1) a connection member having a fluid ingress channel; (2) a body member having a fluid communication channel, a dose cylinder of a predetermined volume, and a dose valve; (3) a piston member having a piston head positioned in the dose cylinder, a distal end, a piston rod connecting the distal end to the piston head, a piston valve, and a fluid egress channel; and (4) a trigger member fixedly connected to the distal end of the piston member.

In operation, an unprimed dispenser contains air in the fluid ingress channel, the fluid communication channel, the dose cylinder, the fluid egress channel and the trigger member. Squeezing the trigger member compresses the piston member and expels the air from the dose cylinder. Releasing the trigger member causes the piston member to undergo an expansion stroke which draws fluid into the fluid ingress channel, the fluid communication channel, and the dose cylinder. The dispenser becomes primed after about two cycles when the dispenser contains fluid in all of its channels and cylinders. A primed fluid dispenser draws the dose or predetermined volume of fluid into the dose cylinder during the expansion stroke of the piston member. The fluid is drawn through the fluid ingress channel and the communication channel. The dose of fluid is expelled from the dose cylinder through the fluid egress channel, the piston valve, and the trigger member during a compression stroke. The dose volume is determined by the predetermined dimensions of the dose cylinder and the predetermined displacement volume of the piston member. The dose volume may either be fixed or adjustable. Different volumes can be attained by replacing the piston member or by placing different sized blocks within the dos cylinder.

In a first "Draw Off" embodiment, the dispenser further includes a mechanism for drawing off or suctioning fluid from a flexible or rigid fluid source container. A fluid stem containing the fluid ingress channel forms part of the connection member and is constructed to receive a hose. The hose connects the fluid source container to the fluid ingress channel. In a second "Threaded Bottle Mount" embodiment, the connection member has an inverted bottle cap form including internally threaded side walls. A flexible or rigid fluid source container with a threaded neck can be screwed onto the connection member so that the fluid is in direct contact with the fluid ingress channel. This second embodiment includes an air intake system which equalizes the pressure between the inside and outside of the fluid source by replacing the fluid dispensed out of the container with air, thus providing smoother and easier fluid flow. The air intake system also prevents contaminants from being suctioned back into the dispenser and into the medicinal supply. In a third "Spike" embodiment, the connection member includes a spike for puncturing a vile, bag or other sealed end, flexible or rigid fluid source container when that container is mounted on the spike. The third embodiment also contains an air intake system for equalizing the pressure between the inside and the outside of the fluid source container. The spike contains both the fluid ingress channel and the vent channel of the air intake system.

The significant features of the present invention are its ability to economically and rapidly process livestock through its accurate placement of fixed doses, its automatic features, and its superior ergonomics. The features, benefits and objects of this invention will become clear to those skilled in the art by reference to the following description, claims and drawings.

BRIEF DESCRIPTION OF THE SEVERAL VIEWS OF THE DRAWING

FIG. 1 is a perspective view of a draw off embodiment of the fluid dispenser apparatus of the present invention used to draw off and administer fluid from a bulk container.

FIG. 2 is a view, partially in cross-section, of a hose attached to the fluid stem of the draw off embodiment of FIG. 1.

FIG. 3 is a side view of a needle attached to a trigger member.

FIG. 11 is a side view, partially exploded and partially in cross-section for clarity, of the spike embodiment of FIG. 5.

FIG. 12 is a side view of the elastomeric valve used as the air valve in FIG. 11.

FIG. 13 is a side view of a check valve that could alternatively be used as the air valve in FIG. 11.

DETAILED DESCRIPTION

Figure 9:
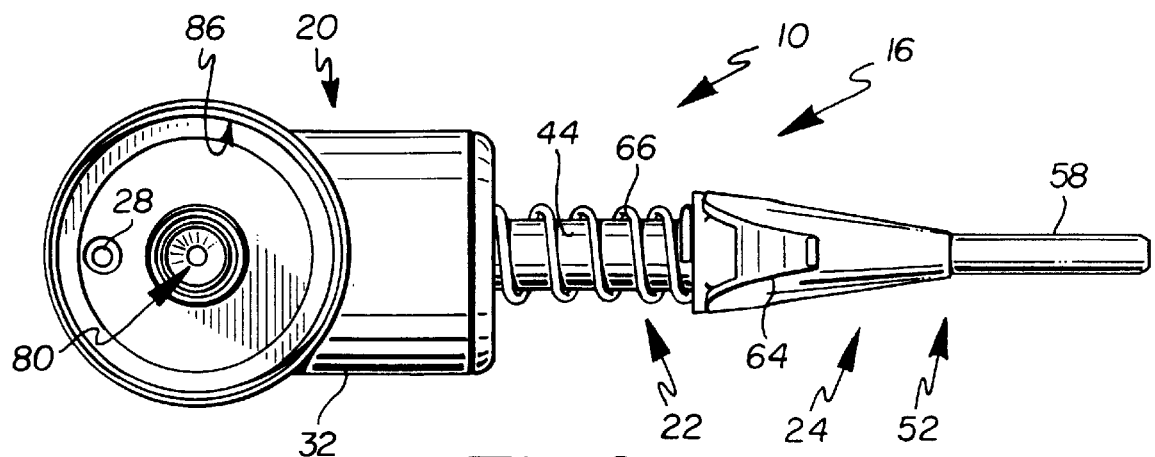
FIG. 9 is a top view of the threaded bottle mount embodiment of FIG. 7.

FIGS. 1–11 show examples of three preferred embodiments of the dispenser apparatus 10. FIGS. 1–2 illustrate a "Draw Off" embodiment 12 of the dispenser 10, FIGS. 4–6, and 11 illustrate a "Spike" embodiment 14 of the dispenser 10, and FIGS. 7–10 illustrate a "Threaded Bottle Mount" embodiment 16 of the dispenser. The dispenser 10 of all three embodiments is described below first in terms of its major structural elements and then in terms of its secondary structural and/or functional elements which cooperate to economically and ergonomically dispense fixed doses of fluid accurately and rapidly. The differences for each embodiment will be described in detail after the general discussion of the dispenser 10.

As generally shown in FIGS. 1, 4, 7, 10–11 the dispenser 10 includes a connection member 18, a body member 20, a piston member 22, and a trigger member 24. The connection member 18 provides fluid communication between the dispenser 10 and a fluid source or fluid source container 26. The connection member 18 is constructed to have a fluid ingress channel 28 through which the fluid flows from the fluid source container 26 and into the body member 20.

Figure 6:
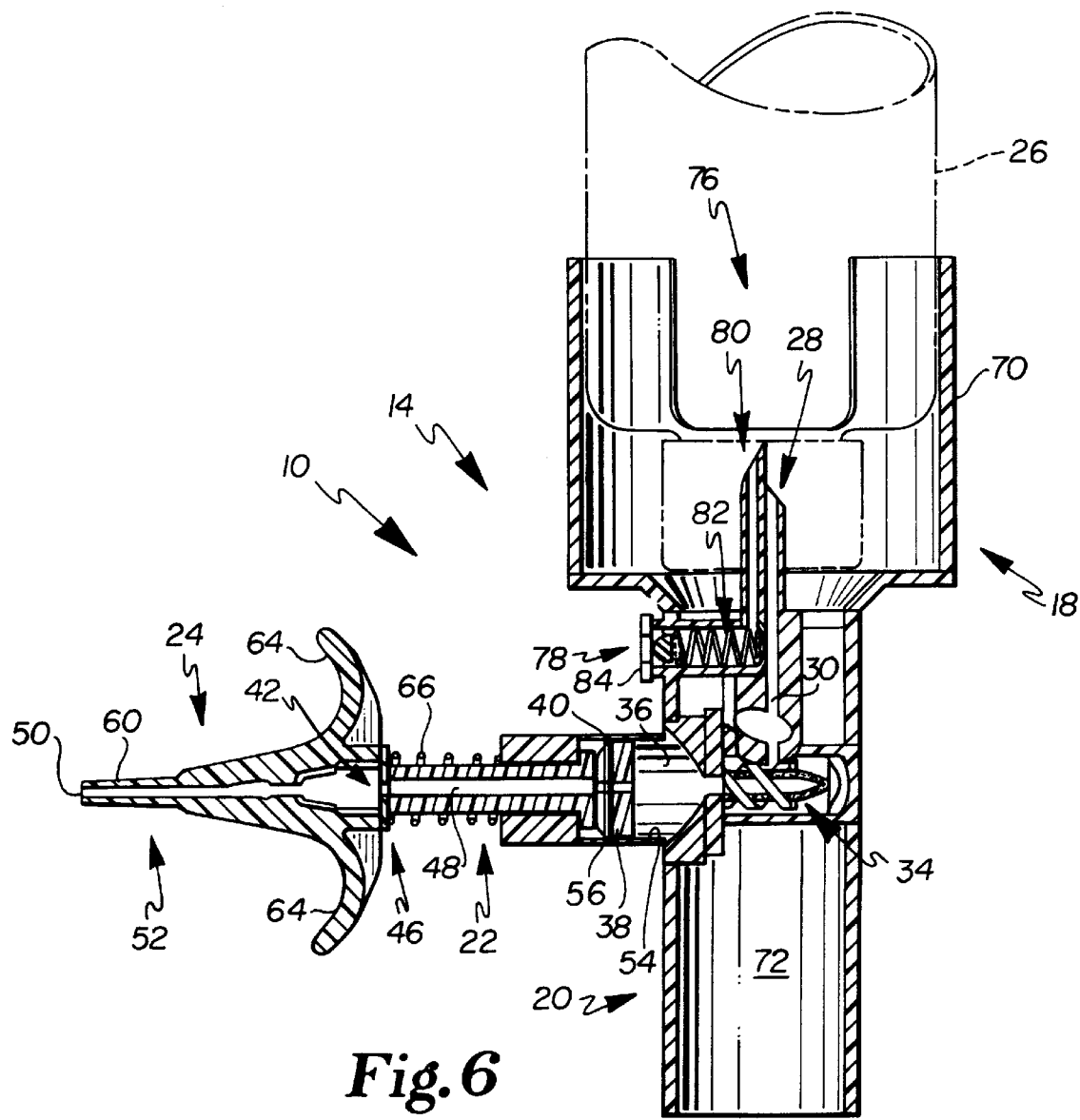
FIG. 6 is a cross section of the spike embodiment taken along line 6—6 of FIG. 5.
Figure 8:
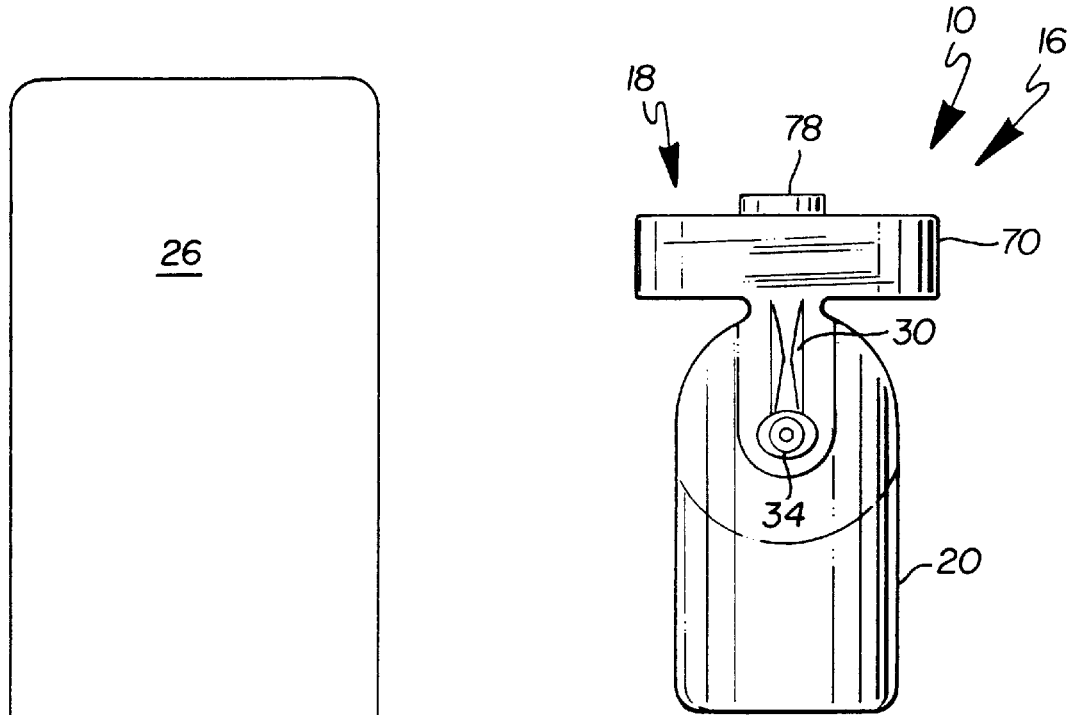
FIG. 8 is a rear view of the threaded bottle mount embodiment of FIG. 7.
Figure 10:
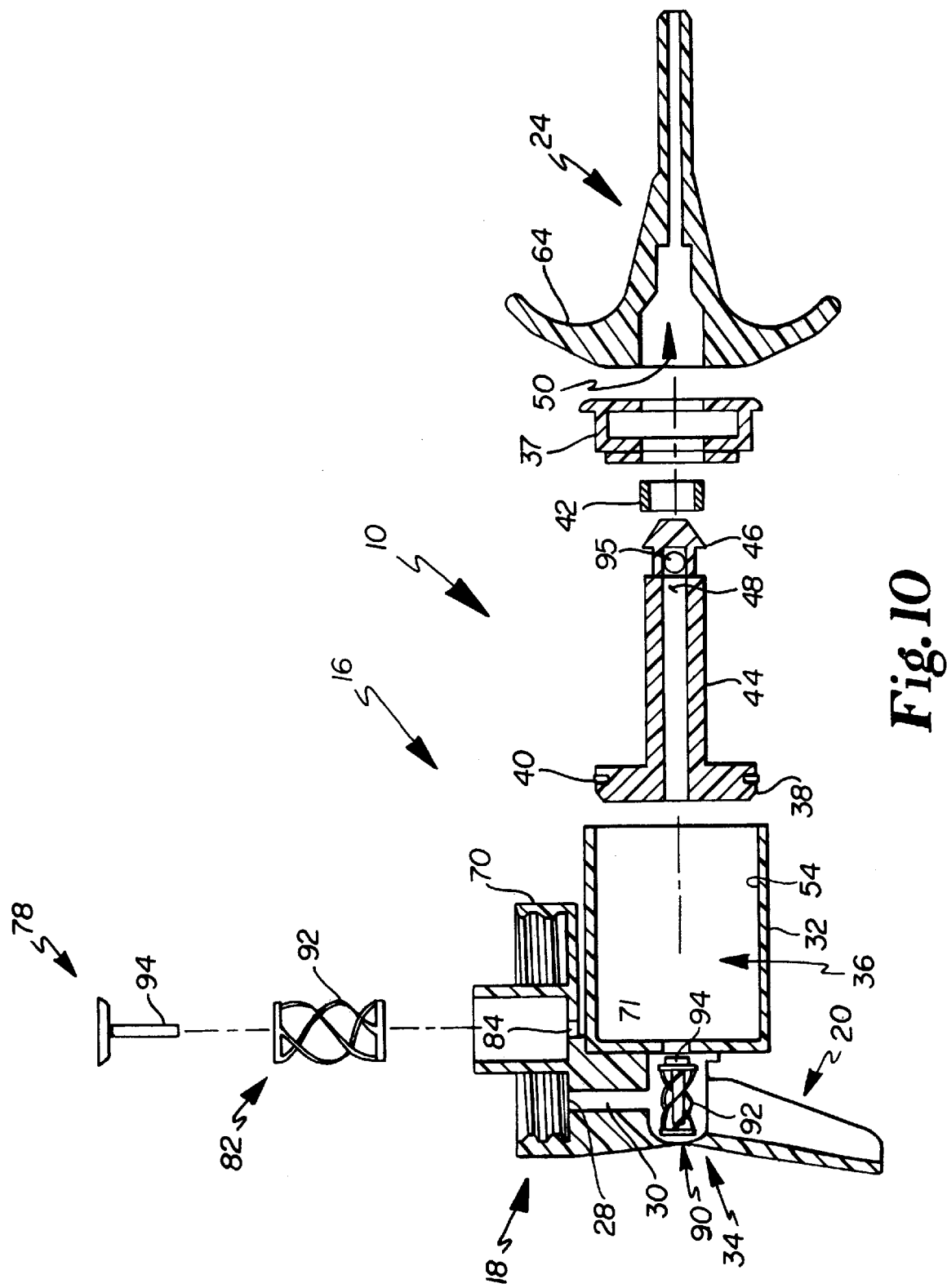
FIG. 10 is a side view, partially exploded and partially in cross-section for clarity, of the threaded bottle mount embodiment of FIG. 7.

The body member 20 is constructed to have a fluid communication channel 30, a dose cylinder 32, and a dose valve 34. The fluid communication channel 30 is communicatively connected to the fluid ingress channel 28 and to the dose cylinder 32 so that fluid flows from the fluid ingress channel, through the fluid communication channel 30, and into the dose cylinder 32. The dose cylinder 32 forms a cylinder for the compression and expansion stroke of the piston member 22. The dose cylinder 32 and piston member 22 are related to each other in such a way as to have a predetermined volume 36 or swept volume that corresponds to the desired dose of the dispensed fluid. As shown in FIGS. 10–11 this volume 36 may be varied by varying the width of the shoulder 35 integrally formed in the dose cylinder 32; or alternatively, it may be varied by interchanging the removable block 37 with one with a different width. Furthermore, a removable piston member 22 could be replaced with a piston member 22 that provides a different swept volume. As shown in FIGS. 6, 10–11 the dose valve 34 is positioned between the fluid communication channel 30 and the dose cylinder 32. The dose valve 34 permits fluid to flow only in the direction from the fluid communication channel 30 to the dose cylinder 32 when the expansion stroke of the piston member 22 causes a pressure differential between the fluid communication channel 30 and the dose cylinder 32, but will not permit fluid to flow from the dose cylinder 32 to the communication channel 30 during a compression stroke. As shown in greater detail in FIGS. 10 and 11, a one-way helix valve 90 is used as the dose valve 34. The helix valve 90 includes a helical portion 92 that fits within the fluid communication channel 30 and a valve stem 94 moveably positioned within the helical portion 92 such that it will form a seal when the pressure in the dose cylinder 32 is greater than the pressure in the communication channel 30. It is anticipated that other pressure-sensitive, one-way valves could be used as the dose valve 34.

Figure 7:
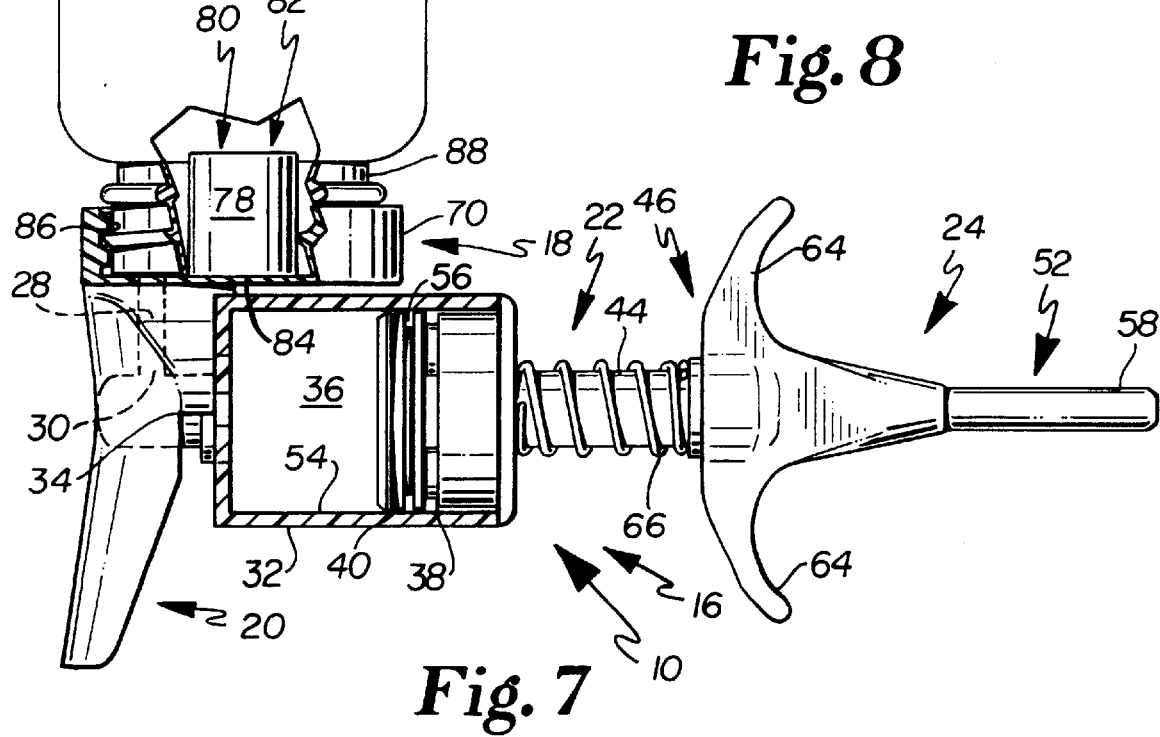
FIG. 7 is a side view, partially in cross-section, of a threaded bottle mount embodiment of the fluid dispenser apparatus of the present invention used to administer liquid from a wide-mouth threaded container.

As shown in FIGS. 6 and 7, the piston member 22 generally includes a piston head 38, an annular gasket 40, a piston valve 42, and a piston rod 44. A fluid egress channel 48 extends through the piston head 38 and piston rod 44 to a distal end 46 of the piston rod 44. The piston head 38 has an outer periphery sized and shaped to have a functionally sealing fit with the interior surface 54 of the dose cylinder 32. The piston head has a circumferential groove 56 about its outer periphery sized to receive the annular gasket 40. The gasket 40 provides the functionally sealing fit with the interior surface 54 of the dose cylinder 32. The piston valve 42 is positioned at the distal end 46 of the piston member 22. As shown in more detail in FIGS. 10 and 11, the piston valve 42 has a form of an elastomeric band that provides a one-way seal around the outlet ports 95 of the fluid egress channel 48. The piston valve 42 permits fluid to only flow out of the fluid egress channel 48 when the compression stroke of the piston member 22 increases the pressure in the fluid egress channel 48. The piston member 22 or plunger provides a non-conventional delivery system for the fluid.

Whereas conventional syringes expel fluid through their barrel end, the present invention expels fluid through its plunger.

The trigger member 24 is attached to the distal end 48 of the piston rod 44. A nozzle channel 50 within the trigger member 24 is communicatively attached to the fluid egress channel 46 and extends through the nozzle portion 52 of the trigger member 24. As required by the pharmaceutical dispensing application, the nozzle portion 52 of any of the embodiments may have the form of an oral tip 58 for oral or intranasal applications, or it may take the form of an injectable tip 60, such as a Luer slip or Luer lock tip, that can be fitted with a needle 62 for injectable applications. The body member 20 may also include a needle storage holder or storage container 72. The trigger member 24 is formed with grips 64 that interface with an operator's fingers when the body member 20 is placed in the operator's palm. An operator squeezes his or her fingers to pull the trigger member 24 toward the body member 20. This action compresses the piston member 22 within the dose cylinder 32 and expels the dose volume of the fluid through the fluid egress channel 48, the piston valve 42, the nozzle channel 50, and out of the nozzle portion 52.

A spring 66 surrounds the piston rod 44 and extends between the trigger member 24 and the dose cylinder 34. The spring 64 biases the piston member 22 in an extended position and, upon the operator's release of the trigger member 24, will automatically produce the expansion stroke by returning the piston member 22 to the extended position. The expansion stroke draws the dose volume of fluid into the dose cylinder 32.

The figures show the piston member 22 and the trigger member 24 extending from the body member 20 at a near right angle. However, the piston member 22 and trigger member 24 could be aligned with the body member 20 such that it is in the general location of the shown position for the storage container 72.

Many elements of the dispenser 10 are manufactured from a clear or relatively transparent plastic material. The body member and connection member are generally molded as a unitary piece of plastic, as is the piston member. This material provides a strong, light weight and inexpensive dispenser 10. Furthermore, the transparent nature of the material allows an operator to visually monitor the device in operation. The dispenser 10 is manufactured to be easily cleaned, sanitized and lubricated. However, it is also inexpensive enough to be considered semi-disposable; that is, it can be disposed after an application or a series of applications as warranted by the circumstances.

The Draw Off embodiment 12 shown in FIG. 1 has an injectable tip 60 for receiving a needle 62 as shown in FIG. 3. The body member 20 is constructed to have a storage container 72 designed to store spare and/or used needles. The storage container 72 is closed with a removable cap 74, plug or other closure. The Draw Off embodiment 12 is designed to dispense fluid from flexible or rigid bulk fluid source containers of various sizes and shapes. The connection member 18 is constructed with a fluid stem 68 that contains the fluid ingress channel 28. The fluid stem 68 is designed to receive a hose 70 that provides a communicative path between the external fluid source container and the fluid ingress channel 28. The connection member 18 also has continuous side walls 70, which in this embodiment are flange-like.

Figure 4:
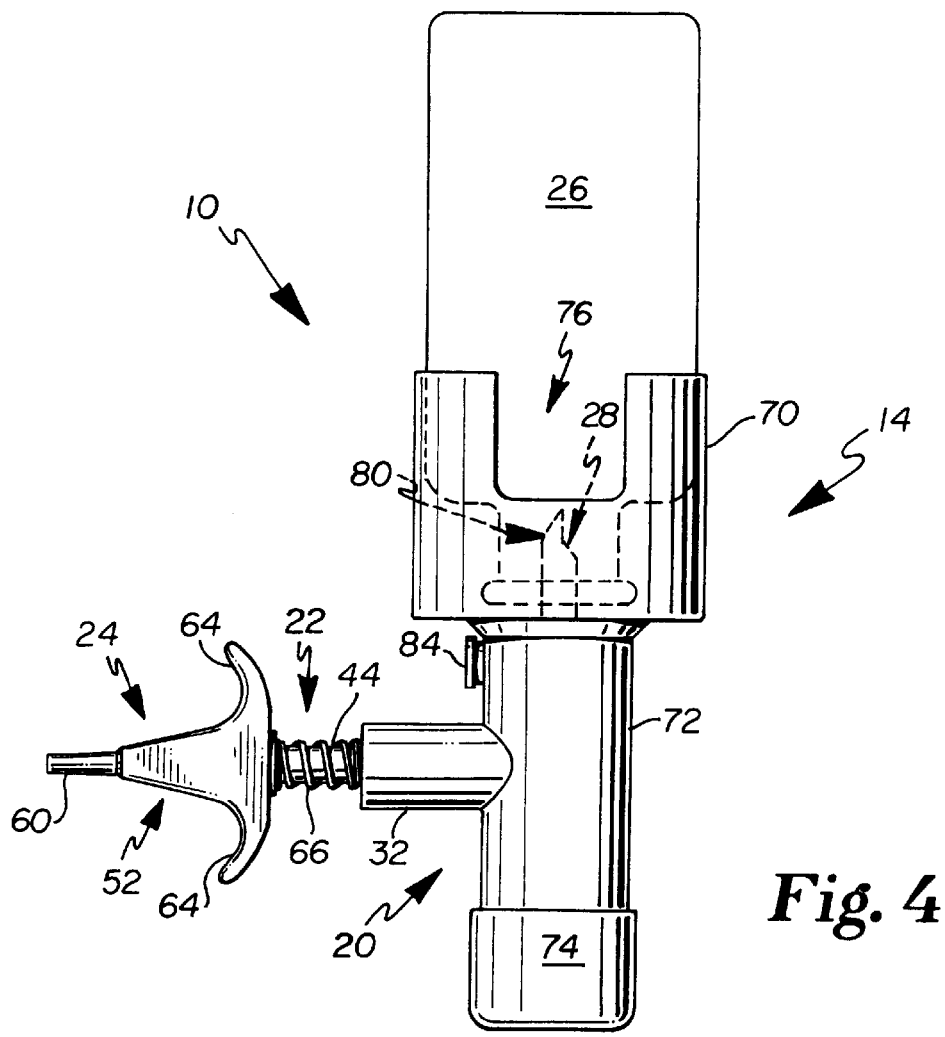
FIG. 4 is a side view of a spike embodiment of the fluid dispenser apparatus of the present invention used to administer fluid from a sealed end pharmaceutical bottle.
Figure 5:
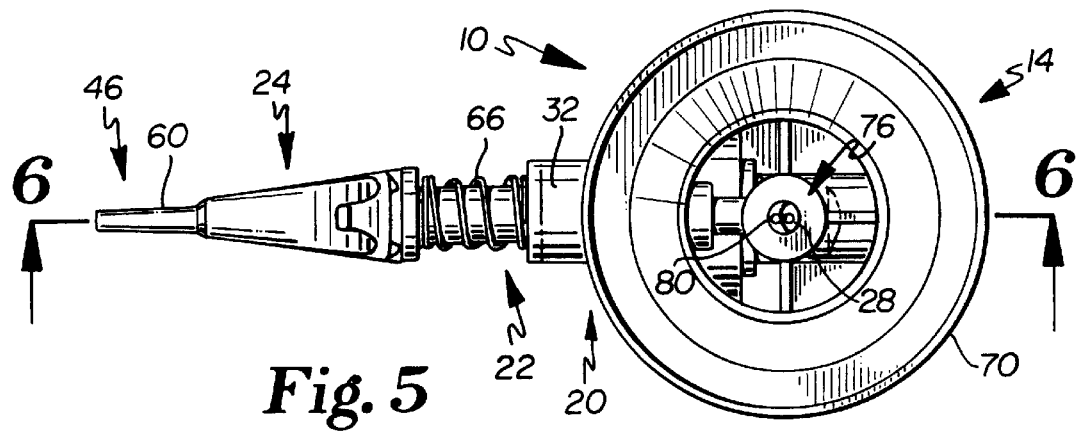
FIG. 5 is a top view of the spike embodiment of FIG. 4.

The Spike embodiment 14 shown in FIGS. 4–6 is shown to have an injectable tip 60 for receiving a needle 62 as shown in FIG. 3. The body member 20 is constructed to have a storage container 72 designed to store spare and/or used needles. The storage container 72 is closed with a removable cap 74, plug or other closure. The Spike embodiment 14 is designed to directly mount a vile or other sealed end fluid source container 26 onto the dispenser 10. The connection member 18 is constructed with a spike 76 designed to puncture through the sealed end of a flexible or rigid fluid source container 26, and with a continuous side wall 70 designed to support the fluid source container 26 in a mounted position. The Spike embodiment includes an air intake system 78 that replaces fluid drawn from the fluid source container 26 with ambient air as an automatic venting function. The air intake system 78 provides for smoother fluid flow and easier operation by equalizing the pressure between the interior and exterior of the fluid source container 26. The air intake system 78 generally comprises a vent channel 80, an air valve 82, and an air intake port 84. The vent channel 80 provides the means for transferring ambient air from the air intake port 84, through the air valve 82, and into the fluid source container 26. A pressure differential is created between the outside and inside of the container 26 when fluid is dispensed. The air valve 82 allows air to enter the container 26 when there is a pressure differential, and it prevents fluid from flowing out of the container 26 the vent channel 80. The spike 76 contains both the fluid ingress channel 28 and the vent channel 80. The air intake system 78, or vent system, can be cleaned without removing the container 26 by injecting air from a syringe into the air intake port 84.

As shown in FIGS. 11, 12 and 13, the air valve 82 may use different types of one-way pressure sensitive valves. FIGS. 11 and 12 show an air valve 82 that uses a wedge-like, elastomeric valve 96. The elastomeric valve 96 has a generally cylindrical shaped proximate end 98 and a distal end 100. The distal end 100 has a slit that is normally closed, thus preventing fluid from flowing out the air intake system 78, but opens relatively easily to allow air to flow into the container 26. Alternatively as shown in FIG. 13, a check valve 102 containing a check ball 104 and spring 106 could be use to provide the one-way valve function.

The Threaded Bottle Mount embodiment 16 shown in FIGS. 7–10 has an oral tip 58. This embodiment is designed to directly attach a bottle or fluid source container 26 onto the dispenser 10 by screwing it onto the connection member 18. The connection member 18 is constructed to have a form similar to an inverted bottle cap, including continuous side walls 70 having interiorly disposed threads 86 designed to mate with exteriorly disposed threads 88 on the container 26, such as a wide mouth threaded container. The connection member 18 has a bottom surface 71 disposed between and joined to the side walls 70. FIG. 10 shows the connection member 18 exploded as a separate element for clarity. However, the connection member 18 is typically molded with the body member 20 as a unitary piece. The fluid ingress channel 28 is formed by an aperture in the bottom surface 71. The Threaded Bottle Mount embodiment includes an air intake system 78 that replaces fluid drawn from the fluid source container 26 with ambient air as an automatic venting function. The air intake system 78 provides for smoother fluid flow easier operation by equalizing the pressure between the interior and exterior of the fluid source container 26, which prevents the fluid from being suctioned back into the container 26 and possibly contaminating the medicinal source. The air intake system 78 generally comprises a vent channel 80, an air valve 82, and an air intake port 84. The vent channel 80 provides the means for transferring ambient air from the air intake port 84, through the air valve 82, and into the fluid source container 26. A pressure differential is created between the inside and outside of the container 26 when fluid is dispensed. The air valve 82 allows air to enter the container 26 when there is a pressure differential, but it prevents fluid from flowing out of the container 26 through the vent channel 80. The air valve 82 shown in FIG. 10 is a helix valve 90 that contains a helical portion 92 and a valve stem 94. It is anticipated that other one-way, pressure sensitive valves could be used. The connection member 18 is constructed to contain the vent channel 80.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A fluid dispenser, comprising:
   (a) a body member having a fluid communication channel and a dose cylinder of a predetermined volume, said fluid communication channel being communicatively joined with said dose cylinder, said body member further having a storage container sized to store a plurality of unmounted needles;
   (b) a fluid egress conduit communicatively connected to said dose cylinder;
   (c) a dose valve positioned and arranged to govern fluid flow from said fluid communication channel to said dose cylinder;
   (d) a piston valve positioned and arranged to govern fluid flow out of said fluid egress conduit;
   (e) a piston member having a piston head, a distal end and a piston rod connecting said piston head to said distal end, said piston head being sealingly fit within said dose cylinder; and
   (f) a trigger member attached to said distal end of said piston member, said trigger member having a portion to receive a mounted needle;
   whereby said fluid dispenser, when primed, draws a dose of fluid through said communication channel into said dose cylinder during a complete expansion stroke of said piston member and expels said predetermined amount of fluid from said dose cylinder through said fluid egress conduit during a complete compression stroke of said piston member.

2. The fluid dispenser of claim 1, wherein said predetermined volume of said dose cylinder is fixed.

3. The fluid dispenser of claim 1, wherein said predetermined volume of said dose cylinder is adjustable.

4. The fluid dispenser of claim 3, further including a removable block positioned within said dose cylinder, said removable block having a predetermined solid volume that reduces a fixed dose cylinder volume to adjust said predetermined volume of said dose cylinder.

5. The fluid dispenser of claim 4, wherein said piston member is a removable plunger having a head of a predetermined volume, said head of said removable plunger forming said removable block.

6. The fluid dispenser of claim 1, wherein said trigger member includes at least one grip formed to interface with at least one finger of the user, whereby said body member rests in the palm of the user's hand and the user's finger squeezes said grip toward said body member to provide force for said compression stroke of said piston member.

7. The fluid dispenser of claim 1, wherein said trigger member includes a nozzle portion and a nozzle channel communicatively connected to said fluid egress conduit.

8. The fluid dispenser of claim 1, wherein said piston member has a fluid egress channel extending through said piston head and said piston rod to said distal end, and said fluid egress channel forms said fluid egress conduit.

9. The fluid dispenser of claim 8, wherein said trigger member includes a nozzle portion and a nozzle channel communicatively connected to said fluid egress channel.

10. The fluid dispenser of claim 1, wherein said piston member is biased in an extended position by a spring, said spring being positioned around said piston member and in between said trigger member and said dose cylinder, whereby said spring provides force for said expansion stroke of said piston member.

11. The fluid dispenser of claim 1, wherein said piston head has a circumference, a groove formed around said circumference, and an annular gasket placed within said groove, said gasket providing said fit within said dose cylinder.

12. The fluid dispenser of claim 1, further comprising a connection member having a fluid ingress channel communicatively connected to a fluid source container and to said fluid communication channel, said fluid source container having an interior and an exterior.

13. The fluid dispenser of claim 12, wherein said connection member has a continuous side wall, said continuous side wall has a predetermined size and shape for receiving and supporting a fluid source container.

14. The fluid dispenser of claim 13, wherein said connection member has a continuous side wall and a bottom surface joined with said side wall, said continuous side wall having interior threads, said fluid source container having external threads, said fluid source container being connected to said connection member by mating said interior threads with said external threads, said bottom surface having an aperture which forms said fluid ingress channel.

15. The fluid dispenser of claim 12, wherein said connection member has a fluid stem, said fluid ingress channel being contained within said fluid stem.

16. The fluid dispenser of claim 15, wherein said fluid stem is formed to receive a hose for drawing fluid from said fluid source container, said hose being communicatively connected between said fluid source container and said fluid stem.

17. The fluid dispenser of claim 15, wherein said fluid stem is a spike designed to penetrate said fluid source container when said fluid source container is directly mounted onto said spike.

18. The fluid dispenser of claim 17, further including an air intake system to equalize pressure between the interior and the exterior of said fluid source container when fluid is drawn out of said fluid source container, said air intake system including an air intake port, a vent channel communicatively connected from said air intake port to said fluid source, and an air valve designed to allow ambient air to flow through said vent channel into said fluid source container upon a pressure differential between the interior and the exterior of said fluid source container and to prevent fluid from flowing out of said fluid source container through said vent channel, wherein said spike further includes a vent channel.

19. The fluid dispenser of claim 12, further including an air intake system to equalize pressure between the interior and the exterior of said fluid source container when fluid is drawn out of said fluid source container.

20. The fluid dispenser of claim 19, wherein said air intake system includes an air intake port, a vent channel communicatively connected from said air intake port to said fluid source, and an air valve designed to allow ambient air to flow through said vent channel into said fluid source container upon a pressure differential between the exterior and the interior of said fluid source container and to prevent fluid from flowing out of said fluid source container through said vent channel.

21. A fluid dispenser, comprising:
(a) a body member having a fluid communication channel and a dose cylinder of a predetermined volume, said fluid communication channel being communicatively joined with said dose cylinder, said body member further having a storage container sized to store a plurality of unmounted needles;
(b) a fluid egress conduit communicatively connected to said dose cylinder;
(c) a dose valve positioned and arranged to govern fluid flow from said fluid communication channel to said dose cylinder;
(d) a piston valve positioned and arranged to govern fluid flow out of said fluid egress conduit;
(e) a piston member having a piston head, a distal end, a piston rod connecting said piston head to said distal end, and a fluid egress channel communicatively connected to said dose cylinder, said fluid egress channel extending through said piston head and said piston rod to said distal end, said fluid egress channel forming said fluid egress conduit, said piston head being sealingly fit within said dose cylinder; and
(f) a trigger member attached to said distal end of said piston member, said trigger member having a nozzle portion and a nozzle channel communicatively connected to said fluid egress channel, said nozzle portion extending through said nozzle portion, said trigger member having a portion to receive a mounted needle; and
(g) a connection member having a fluid ingress channel communicatively connected to a fluid source container and to said fluid communication channel.

22. A fluid dispenser, comprising:
(a) a connection member having a fluid ingress channel communicatively connected to a fluid source container said fluid source container having an interior and an exterior, said connection member having a continuous side wall of a predetermined size and shape for receiving and supporting a fluid source container and having a spike designed to penetrate said fluid source container when said fluid source container is directly mounted onto said spike;
(b) a body member having a fluid communication channel, a dose cylinder of a predetermined volume, and a dose valve, said fluid communication channel being communicatively joined with said fluid ingress channel and said dose cylinder, said dose valve being positioned between said fluid communication channel and said dose cylinder, said dose valve governing fluid flow from said fluid communication channel to said dose cylinder, said body member further having a storage container sized to store a plurality of needles; said storage container having a closure;
(c) a piston member having a piston head, a distal end, a piston valve, and a fluid egress channel communicatively connected to said dose cylinder, said fluid egress channel extending through said piston head and said piston rod to said distal end, said piston head having a circumference, a groove formed around said circumference, an annular gasket placed within said groove to form a sealing fit within said dose cylinder, said piston valve being positioned and arranged to govern fluid flow out of said fluid egress channel, said piston member being biased in an extended position by a spring, said spring being positioned around said piston member;
(d) a trigger member attached to said distal end of said piston member, said trigger member having a nozzle channel communicatively connected to said fluid egress channel, said trigger member including at least one grip formed to interface with at least one finger, said spring being positioned in between said trigger member and said dose cylinder; and
(e) an air intake system for equalizing pressure between the interior and the exterior of said fluid source container when fluid is drawn out of said fluid source container, said air intake system including an air intake port, a vent channel communicatively connected from said air intake port to said fluid source container, and an air valve designed to allow ambient air to flow through said vent channel into said fluid source container upon a pressure differential between the exterior and the interior of said fluid source container, and to prevent fluid from flowing out of said fluid source container through said vent channel.

23. A fluid dispenser, comprising:
(a) a body member having a fluid communication channel and a dose cylinder of a predetermined volume, said fluid communication channel being communicatively joined with said dose cylinder, said predetermined volume of said dose cylinder being adjustable, said dose cylinder containing a removable block, said removable block having a predetermined solid volume that reduces a fixed dose cylinder volume to adjust said predetermined volume of said dose cylinder;
(b) a fluid egress conduit communicatively connected to said dose cylinder;
(c) a dose valve positioned and arranged to govern fluid flow from said fluid communication channel to said dose cylinder;
(d) a piston valve positioned and arranged to govern fluid flow out of said fluid egress conduit;
(e) a piston member having a piston head, a distal end and a piston rod connecting said piston head to said distal end, said piston head being sealingly fit within said dose cylinder; and
(f) a trigger member attached to said distal end of said piston member;
whereby said fluid dispenser, when primed, draws a dose of fluid through said communication channel into said dose cylinder during a complete expansion stroke of said piston member and expels said predetermined amount of fluid from said dose cylinder through said fluid egress conduit during a complete compression stroke of said piston member.

24. The fluid dispenser of claim 23, wherein said piston member is a removable plunger having a head of a predetermined volume, said head of said removable plunger forming said removable block.

* * * * *